US009071636B2

(12) United States Patent
Raman et al.

(10) Patent No.: US 9,071,636 B2
(45) Date of Patent: Jun. 30, 2015

(54) PREDICTIVE SCORING MANAGEMENT SYSTEM FOR APPLICATION BEHAVIOR

(75) Inventors: Madhusudan Raman, Sherborn, MA (US); Renu Chipalkatti, Lexington, MA (US); Jeffrey Getchius, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 326 days.

(21) Appl. No.: 13/332,886

(22) Filed: Dec. 21, 2011

(65) Prior Publication Data

US 2013/0167231 A1    Jun. 27, 2013

(51) Int. Cl.
*G06F 12/14* (2006.01)
*H04L 29/06* (2006.01)
*H04L 9/32* (2006.01)
*G06F 15/173* (2006.01)
*G06F 21/55* (2013.01)
*G06F 21/56* (2013.01)
*H04W 12/12* (2009.01)
*H04L 12/26* (2006.01)
*G06F 21/57* (2013.01)

(52) U.S. Cl.
CPC ......... *H04L 63/1416* (2013.01); *H04L 63/1433* (2013.01); *H04L 63/08* (2013.01); *H04L 43/00* (2013.01); *H04L 63/1408* (2013.01); *G06F 21/577* (2013.01); *G06F 21/552* (2013.01); *G06F 21/56* (2013.01); *H04W 12/12* (2013.01)

(58) Field of Classification Search
CPC .............. G06F 21/577; H04L 63/1433; H04L 63/1416; H04L 63/1408; H04L 63/08; H04L 43/00
USPC ................ 726/23, 25; 713/165, 168; 709/224
See application file for complete search history.

(56) References Cited

U.S. PATENT DOCUMENTS

| 2007/0240217 A1* | 10/2007 | Tuvell et al. ..................... 726/24 |
| 2011/0145920 A1* | 6/2011 | Mahaffey et al. ................ 726/22 |
| 2012/0072968 A1* | 3/2012 | Wysopal et al. .................. 726/1 |
| 2013/0078949 A1* | 3/2013 | Pecen et al. ..................... 455/411 |

\* cited by examiner

*Primary Examiner* — Aravind Moorthy

(57) ABSTRACT

A system may be provided that comprises one or more servers to: receive information regarding known epitypes of malness, where the information includes malness scores and behaviors for the known epitypes of malness; store the information regarding the known epitypes of malness; generate rules for a model based on the information regarding the known epitypes of malness; input application data from an application on a device into the model; output a malness score from the model based on the application data; and allow the application and/or the device access to a network when the malness scores for the application is below a first threshold level, or block the application and/or the device access to the network when the malness score the application is above a second threshold level, where the first threshold level is less than the second threshold level.

20 Claims, 8 Drawing Sheets

US 9,071,636 B2

PREDICTIVE SCORING MANAGEMENT SYSTEM FOR APPLICATION BEHAVIOR

BACKGROUND

Malicious software, or "malware," is becoming more pervasive in personal and business mobile devices. As more mobile devices are being used in an enterprise setting, the crossover between mobile devices and enterprise networks can increase the threat of mobile device malware seeking access to enterprise networks.

DETAILED DESCRIPTION OF PREFERRED EMBODIMENTS

The following detailed description refers to the accompanying drawings. The same reference numbers in different drawings may identify the same or similar elements.

Figure 1:
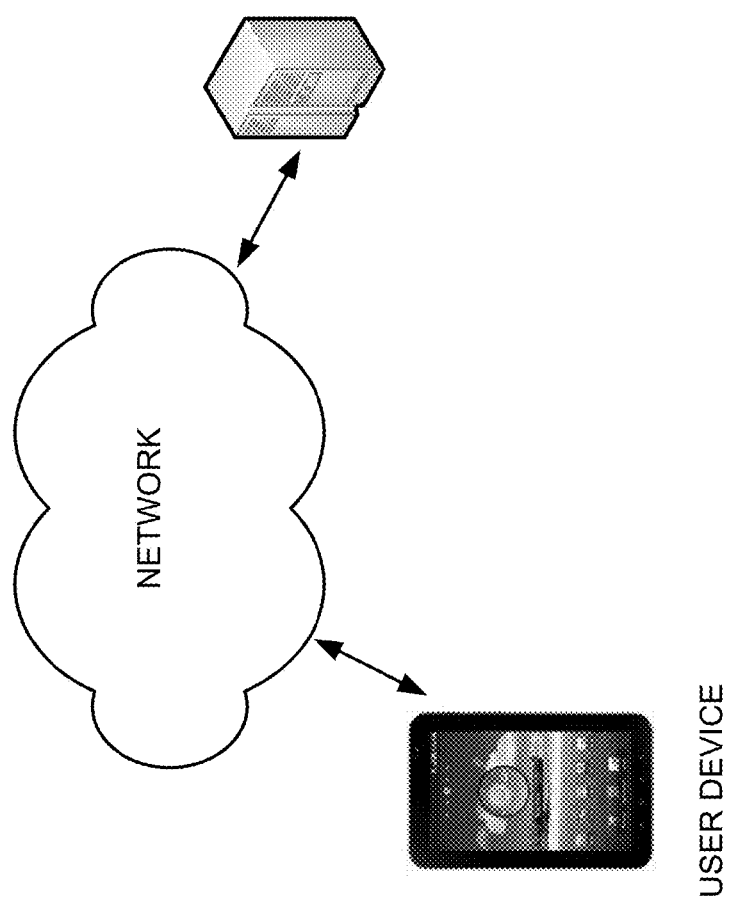
FIG. 1 is a diagram of an overview of an implementation described herein.

FIG. 1 is a diagram of an overview of an implementation described herein. As shown in FIG. 1, a user of a user device may communicate with a server through a network. This communication can include downloading and/or uploading information from the server to the user device. While control over some user devices can be achieved through enterprise security, control over other user devices, such as a personal user device, can be more difficult. As such, applications loaded onto these user devices may contain malware, which can be uploaded to the network and can cause problems. Malware can be problematic for a network, where malware can include applications that have a higher level of "malness" or "propensity for malness" when compared to other applications or a threshold malness level.

Malness of an application can be defined as misbehavior when the application is installed and running on the intended user device. The malness can be caused intentionally or unintentionally, where the misbehavior can include: (1) aggrandizing of resources, (2) unauthorized access to resources, (3) unauthorized sharing or distribution of resources or information, or (4) other undesirable network behavior.

The description to follow will describe the malware in terms of a propensity for malness (referred to generally as "propensity for malness" or "malness"), which is a gradient or scale descriptor (and not a binary descriptor) of the likelihood that an application will negatively impact a network. Unlike computer viruses, malware can include several degrees of malness. For example, an application can have a high, medium, or low propensity for malness, which can correlate to the likelihood that an application affects a network. Another example can measure malness on a scale, such as a scale of 1 to 100.

Malness can also be identified on the basis of the existence of certain characteristic code profiles in execution memory, where the malness code profiles can be "epitypes" that exhibit specific behavior. The degree of malness of applications can be predicted using epitypes to form a model. Epitypes can be defined as characteristic patterns of code functionality that are executed in memory during the normal operation of an application. For example, one epitype might be a Bluetooth based pair-seeking portion of code, where the epitype includes code from an application instructing a device to seek its nearest Bluetooth neighbor. This epitype could contain characteristic patterns of code functionality, such as sending and receiving signals to all neighboring Bluetooth devices, for example.

Malness can be classified with vector profiles, such as topological vectors, scanning vectors, and propagation vectors, where the epitypes define the vectors and the vectors define the "bad behavior," and where vectors can define how an application utilizes resources in user device 210. For example, topological vectors can utilize resources by mapping a topology (e.g., tracking movements using GPS and a mapping application on user device 210) by continuously mapping or tracking locations on the mapping application (even if the mapping application is closed or tracking is turned off), where the malness can cause disruption by increasing network traffic by using resources for this mapping or tracking As another example, scanning vectors can be associated with scanning the environment around a component as directed by the application, where the malness can utilize battery life by continuously scanning (e.g., searching for a Bluetooth signal). As another example, propagation vectors can exist in an application as "X" now, then "Y," and then "Z," where the application changes its name as the application moves from device to device (e.g., like a virus) thus utilizing network resources.

Epitypes may be used to predict mal-behavior or a propensity for malness in applications by using epitypes to correlate malness for applications. For example, a low malness application may have code characteristic similar to epitypes of known low malness level applications, while a high malness application may have code characteristics similar to epitypes of known high level malness applications.

Epitypes may be used to create a learning model. In one implementation, a database of epitypes can be used with a malness analysis server to build a learning model. For example, using a database of known epitypes with malware and their levels of malness in the database, these epitypes can be input into a malness analysis server and a learning model can be built based on the epitypes.

A propensity for malness can be predicted for new applications using learning models. Learning models can be built with Predictive Model Markup Language (PMML) and can pre-score epitypes with known vector profiles to learn how to classify malness. For example, a learning engine can pre-score a set of known applications with known malness levels to learn how to classify malness for a new application that has not yet been scored.

Figure 2:
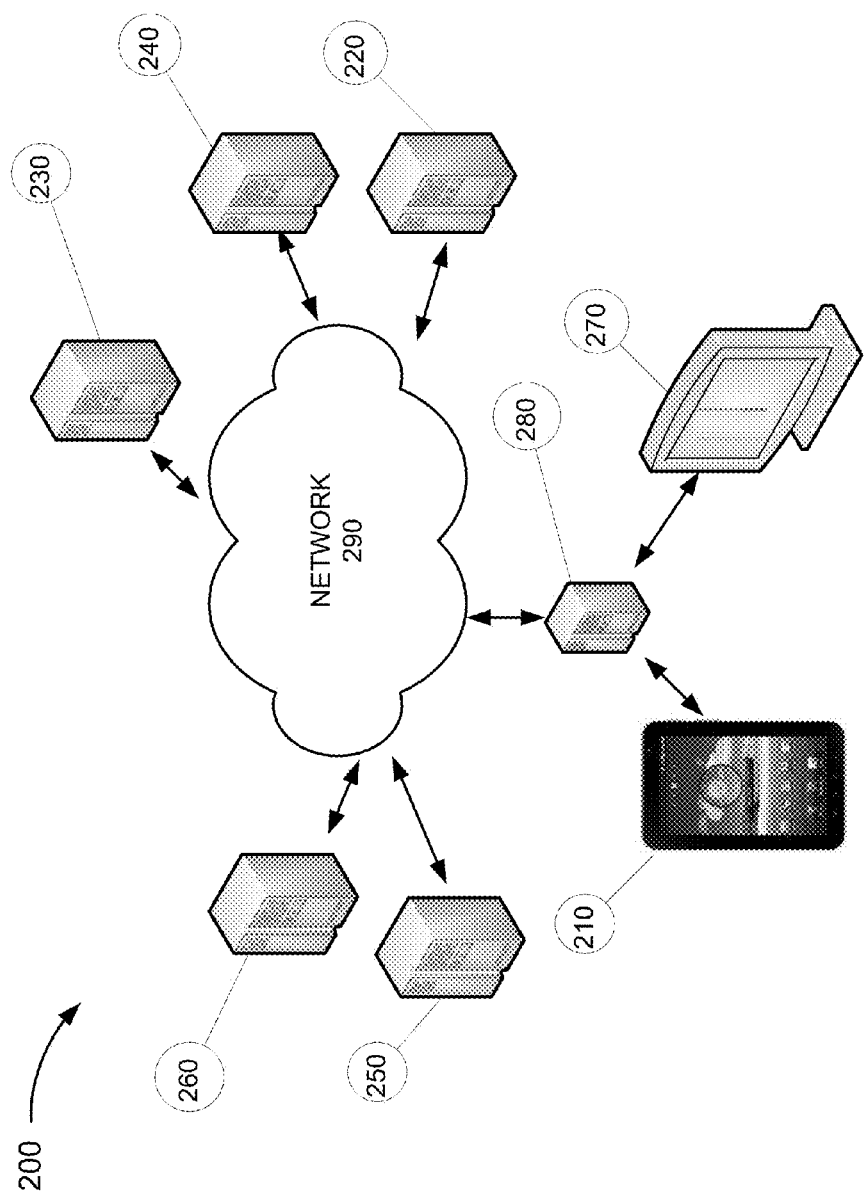
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include: a user device 210; a network server 220; a malness analysis server 230; an epitype storage server 240; a learning engine model hosting server 250, a scoring engine server 260; an enterprise device 270; a malness scoring interface server 280; and a network 290.

Environment 200 can include an enterprise network that connects devices (e.g., user device 210, the network server 220, the malness analysis server 230, an epitype storage server 240, the learning engine model hosting server 250, the scoring engine server 260, an enterprise device 270, the malness scoring interface server 280) to network 290. In one implementation, an enterprise administrator can automatically or manually control devices and control access within environment 200, including access to network 290, for any of the devices in environment 200.

User device 210 may include any device capable of communicating via a network, such as network 290. For example, user device 210 may correspond to a mobile communication device (e.g., a mobile phone or a personal digital assistant (PDA)), a portable computer device (e.g., a laptop or a tablet computer), a consumer device (e.g., a point of sale device, a vending machine, or a handheld credit card device), or another type of network-capable device.

Network server 220 may include a server that provides a backend support system that can be accessed by enterprise device 270. Network server 220 may include a server device, such as a computer device, that provides processing, storage, etc. For example, network server 220 can include a database server, a file server, a mail server, a print server, and/or a web server.

Malness analysis server 230 may include a server that analyzes vector profiles based on stored epitypes. For example, a propagation vector profile can be provided to malness analysis server 230, where the malness of an application can be determined based upon the application's propagation vector profile compared to stored propagation vector profiles from known to determine whether the malness of the application is approximately equivalent to any of the stored epitypes and, thus, has a similar malness level to any of the stored epitypes.

Epitype storage server 240 may include a server that stores known epitypes for use by malness analysis server 230. For example, malness can be determined by detecting and scoring epitypes embedded in an application and comparing the epitypes with known and stored epitypes, which can be stored in epitype storage server 240.

Learning engine model hosting server 250 may include a server that hosts a model created by a data mining application, where the model can be used to make predictions for new data. Learning engine model hosting server 250 can be built using historical data on known applications including applications with known malware, as well as applications known to not have malware. A learning engine model hosting server 250 can pre-score a known set of applications with known vector profiles, and thus learn how to classify malness. When a new application needs to be scored, the new application's vector profile can be submitted to scoring engine server 260 that can provide a malness score for the application. For example, learning engine model hosting server 250 can be built with data gathered from applications with known high and low incidents of malware.

Additionally, learning engine model hosting server 250 may be updated to revise the learning model. In one implementation, the learning engine model hosting server 250 can continue learning constantly or intermittently such that new applications or revised applications can be used to change the model so that the model can be updated regularly. For example, as applications are revised and new applications are created, the learning model can be updated to include new epitypes.

Scoring engine server 260 may include a server with a cross-network based scoring engine that can interact with learning engine model hosting server 250 and a dataset and produce malness scores for applications in the dataset. In one implementation, scoring engine server 260 can be cloud-based such that scoring engine server 260 can aggregate information across segments through the cloud and can allow users to have immediate access regardless of where the information is stored or the learning occurs. For example, using learning engine model hosting server 250 and data from an application loaded on user device 210, a malness score for the application can be generated by scoring engine server 260. In one implementation, scoring engine server 260 can include software to control access to network 290, such as a malware management software program. In other implementations, software to control access to network 290, such as a malware management software program, can be included on the enterprise device 270 or any server in environment 200.

Enterprise device 270 may include a server with access to servers and devices in environment 200 and servers and devices on network 290. In one implementation, enterprise device 270 can include an administrative server, a computer terminal, and/or a mobile device, which can be similar to user device 210, with full or limited administrative rights throughout environment 200. Enterprise device 270 can process requests for malness scores for applications, allow or deny access to environment 200, or control any portion of environment 200. For example, enterprise device 270 can request a malness score for an application on user device 210 from scoring engine server 260, where the malness score can be displayed on enterprise device 270. As another example, enterprise device 270 can block or allow access of an application or a device to environment 200. As another example, enterprise device 270 can set and revise thresholds for blocking or allowing access to environment 200, such as a first threshold level and a second threshold level for blocking or allowing access of an application and/or a device to environment 200 to protect environment 200 from malware.

Malness scoring interface server 280 may include a server that can interact with applications on user device 210 to request data from user device 210 regarding applications and provide malware scores to enterprise device 270. For example, malness scoring interface server 280 can be used to send application data from one or more applications located on user device 210 to scoring engine server 260 to score the one or more applications.

Network 290 may include one or more wired and/or wireless networks. For example, network 290 may include may include a cellular network, the Public Land Mobile Network (PLMN), and/or a second generation (2G) network, a third generation (3G) network, a fourth generation (4G) network, a fifth generation (5G) network, and/or another network (e.g., a LTE network). Additionally, or alternatively, network 160 may include a wide area network (WAN), a metropolitan area network (MAN), an ad hoc network, an intranet, the Internet, and/or a combination of these or other types of networks.

Figure 3:
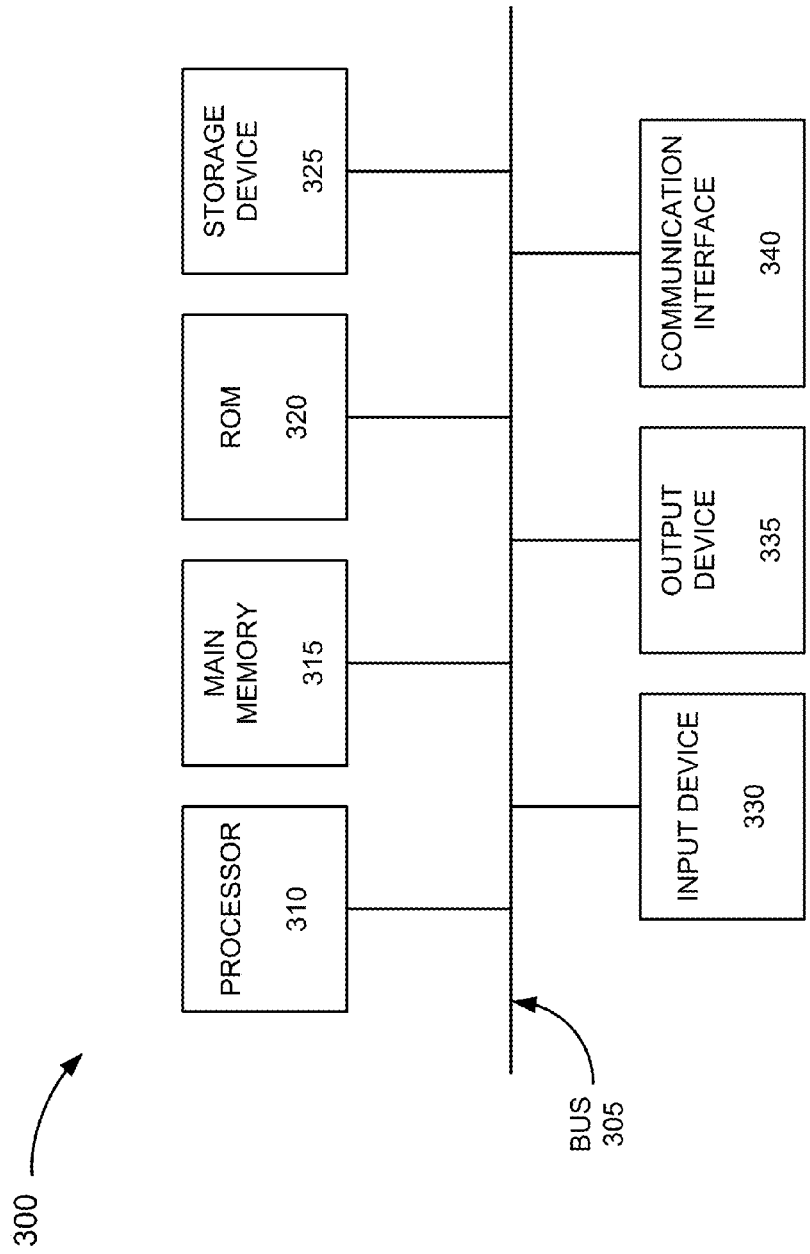
FIG. 3 is a diagram of example components of a device that may be used within the environment of FIG. 2.

FIG. 3 is a diagram of example components of a device 300. Device 300 may correspond to user device 210, network server 220, malness analysis server 230, epitype storage server 240, scoring engine server 260, enterprise device 270, malness scoring interface server 280, or any other server in environment 200. Each of network server 220, malness analysis server 230, epitype storage server 240, scoring engine server 260, and enterprise device 270, and any other server in environment 200 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In another implementation, device 300 may include additional, fewer, different, or differently arranged components.

Bus 305 may include a path, or collection of paths, that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, a microphone, or another type of input device. Output device 335 may include a mechanism that outputs information to the operator, such as a light emitting diode (LED), a display, a speaker, or another type of output device. Communication interface 340 may include any transceiver-like mechanism that enables device 300 to communicate with other devices (e.g., user device 210) or networks (e.g., network 290). In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
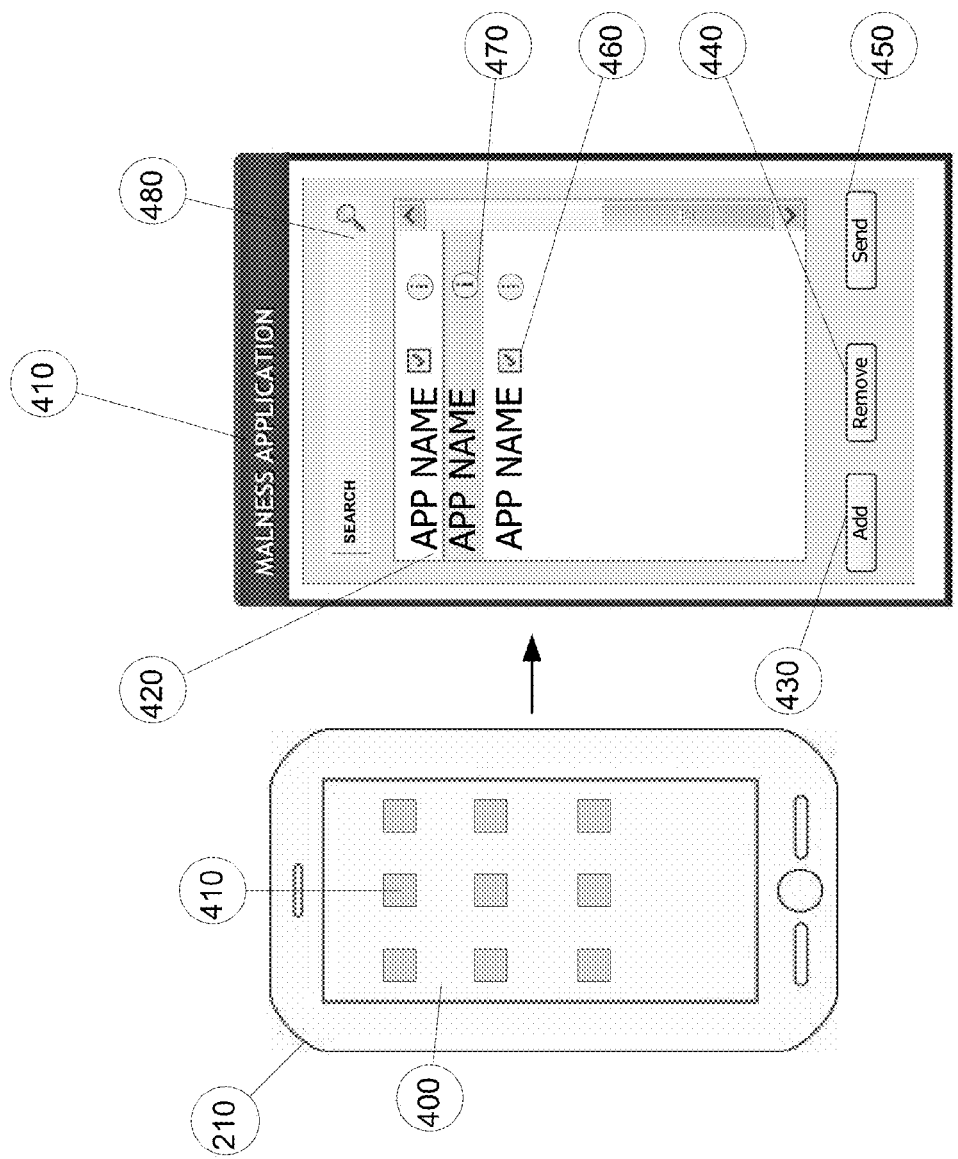
FIG. 4 is a diagram of an example implementation of a user interface on a user device.

FIG. 4 is a diagram of an example implementation of a user interface 400 on user device 210. In one implementation, user device 210 can upload applications for malness analysis to assist in building or revising a learning engine model or to analyze applications for malness scores. In one implementation, user device 210 can used by an administrator of environment 200 or a non-administrative user of environment 200, where user device 210 can be used to upload applications for malness analysis. For example, the administrator of environment 200 may want to upload applications from user device 200 to update the learning model engine or to identify potential malware applications that users may have loaded on user devices 210 before user devices 210 are permitted to access network 290 on environment 200. As another example, a non-administrative user of environment 200 may want to upload applications from user device 210 to check for malness levels before loading the applications on their user device 210, so that the non-administrative user will not have issues with being blocked from network 290 from administrator if the applications are deemed unacceptably high in malness.

In the implementation shown in FIG. 4, the user interface 400 can include one or more icons corresponding to one or more applications. The icons can be selected from the user interface 400 by a user of the user interface, or a network administrator, who may also use user device 210. A user can select an icon from the user interface 400 corresponding to launching a malness application 410 to launch a malness application 410. The malness application 410 can include a listing of application names 420, an add button 430, a remove button 440, a send button 450, an interactive box 460, an information button 470, and an interactive search area 480.

The malness application 410 can include a listing of application names 420 from user device 210 that will be checked for malware. For example, if there are thirty applications loaded on user device 210, then up to thirty applications can be listed on the listing of application names 420. The listing of application names 420 can include any number of selected applications including none or all applications.

The add button 430 can be used for adding applications to the listing of application names 420. For example, if an application is to be added to the listing of application names 420, then the application name can be added by selecting the application name and pressing the add button 430.

The remove button 440 can be used for removing applications from the listing of application names 420. For example, one or more applications can be removed from the listing of application names 420 by selecting the application name and pressing the remove button 440.

The send button 450 can be used to send the listing of application names 420 for scoring. For example, the listing of application names 420 can be sent to the scoring engine server 260 for malness scoring of the applications on the listing of application names 420 by using the send button 450.

The interactive box 460 can be used to allow for individual selection of an application. For example, if an application is to be removed, the interactive box 460 may be checked and the remove button 440 can be pressed to remove the application from the listing of application names 420. Additionally, the listing of application names 420 can list the applications with the interactive box when the applications can be accessed, but can also not provide the interactive box when the application cannot be accessed.

The information button 470 can be used to provide information about an application. For example, a full description of an application can be provided by selecting the information button 470.

The interactive search area 480 can be used to search for specific applications. For example, an application name or part of an application name can be entered into interactive search area 480 for the application, which may result in the application being included on the listing of application names 420.

Figure 5:
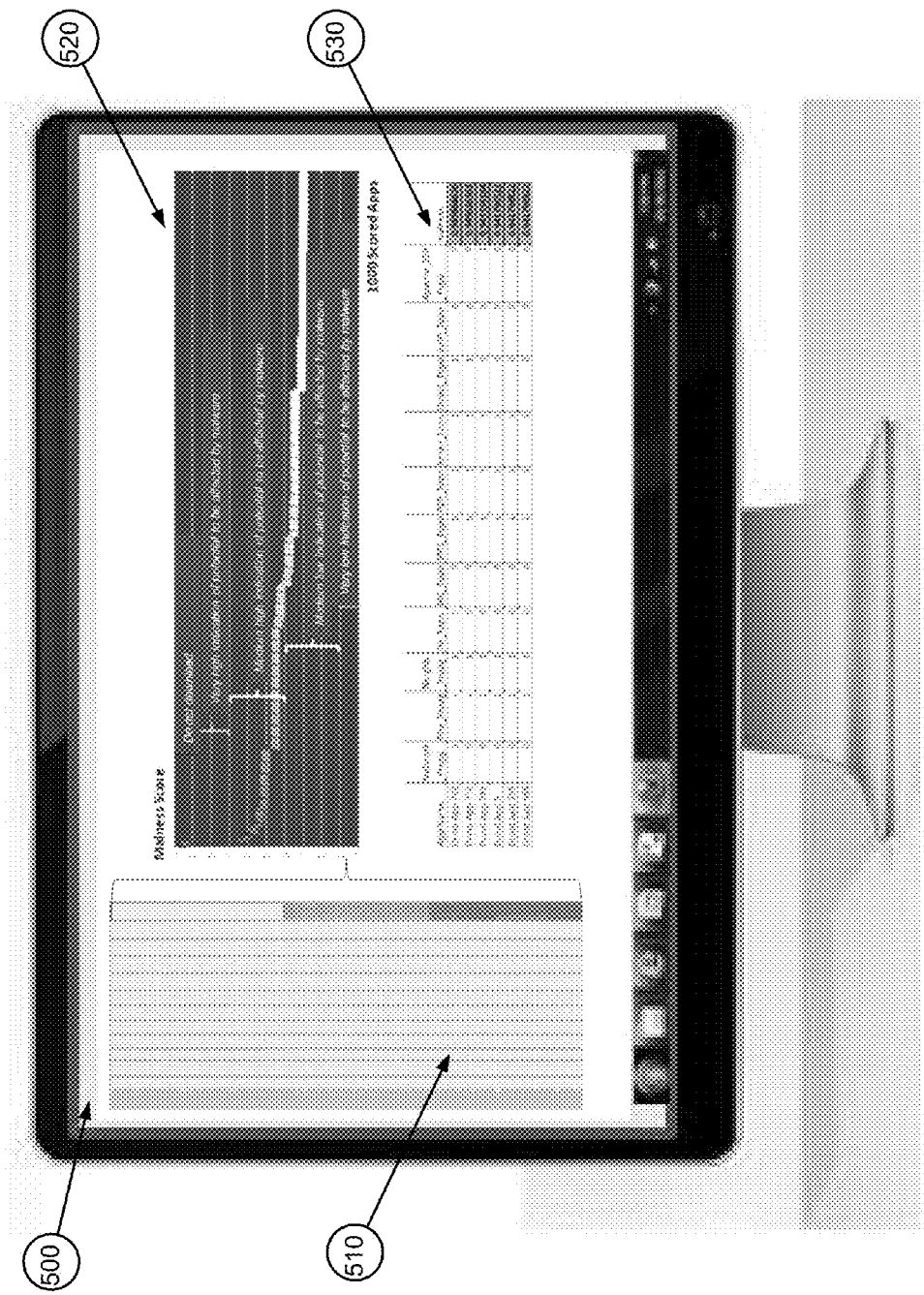
FIG. 5 illustrates an example user interface for an enterprise device.

FIG. 5 illustrates an example user interface 500 for enterprise device 270. User interface 500 can include a malness propensity table 510, a malness propensity chart 520, and a malness propensity detail 530. By providing user interface 500, a network administrator can be provided with real time scores of malness for applications. Knowing the propensity for malness allows administrators to make informed actions regarding a particular application on user device 210 about whether prior to allow access to network 290.

Malness propensity table 510 can include a table with application information including malness attributes for each application. For example, malness propensity table 510 can list each application in a separate row, where malness attributes, such as propagation information, vector information, and malness score can also be listed in the same row.

Malness propensity chart 520 can illustrate a malness score for one or more applications. In one implementation, each application can be shown on a chart illustrating that certain applications have higher propensities for malness than other applications (see the portions on the left that have higher malness scores compared to the portions on the right that have lower malness levels or values). In FIG. 5, malness propensity chart 500 is illustrating, for example, 1000 applications and scores.

Malness propensity detail 530 can display a magnified view of portions of malness propensity table 510. For example, as illustrated in FIG. 5, malness propensity detail 530 illustrates the same information as the malness propensity table 510 with details of only a few applications viewable (e.g., a focused or "zoomed in" view in the malness propensity detail 530 compared to the malness propensity table 510 which illustrates details for all of the applications).

Figure 6:
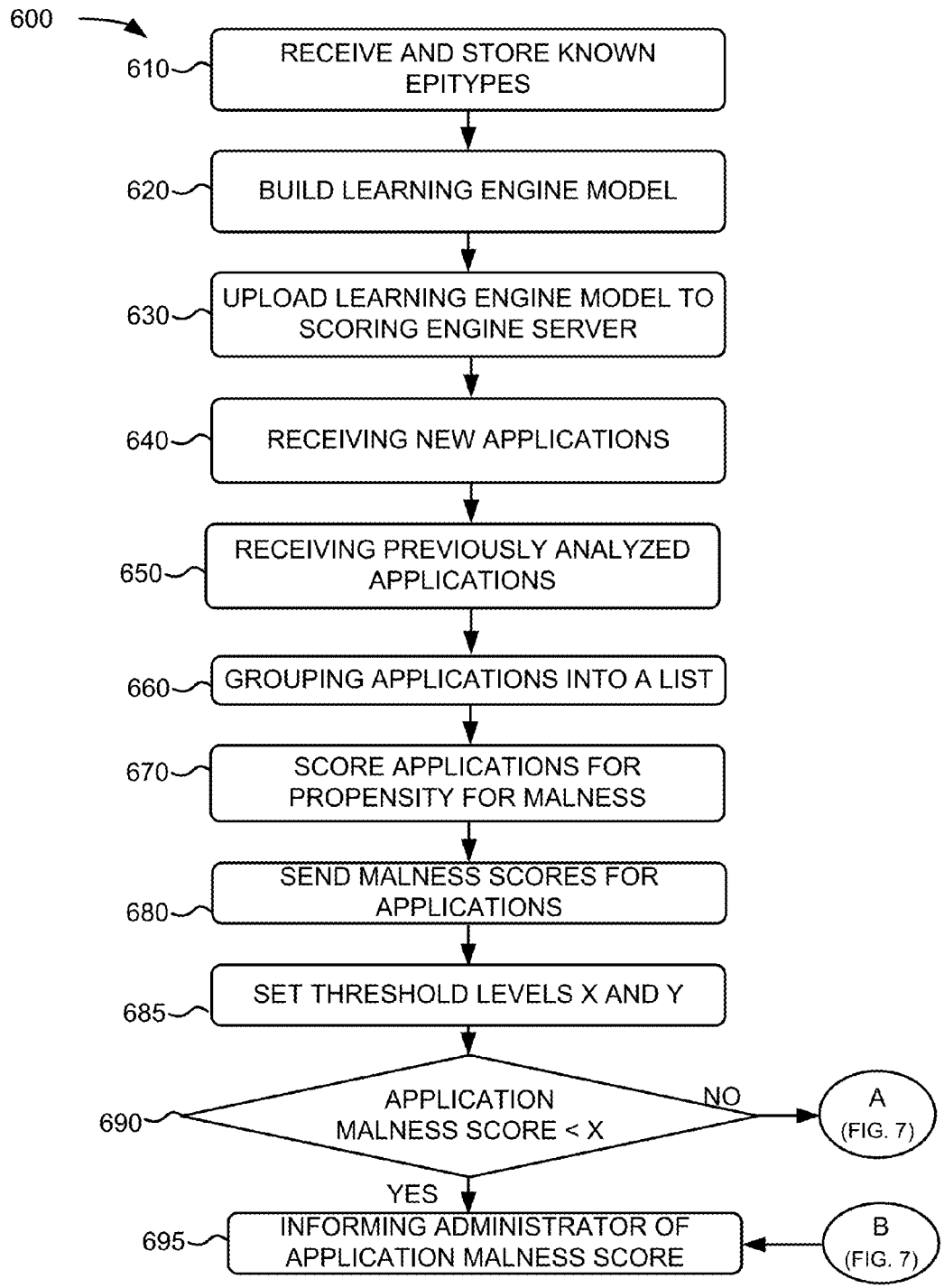
FIGS. 6 and 7 are a flowchart of an example process for obtaining and using malness scores.
Figure 7:
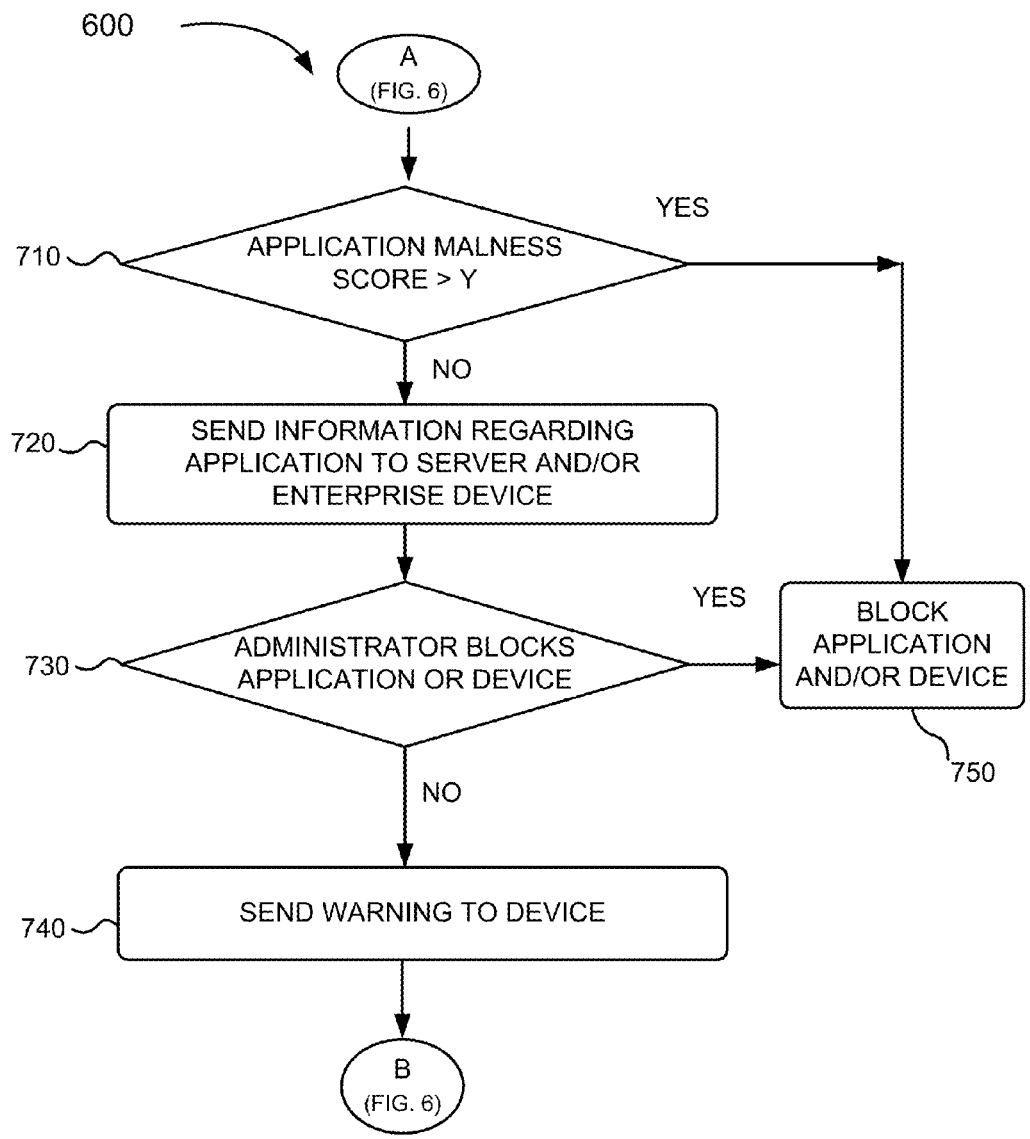

FIGS. 6 and 7 are a flowchart of an example process 600 for obtaining and using malness scores. In one implementation, process 600 can obtain gradations of malness scores for applications by detecting and scoring epitypes embedded in an application that indicates the application's propensity to harbor malness. In one implementation, process 600 may be performed by one or more components of one or more servers 220, 230, 240, 260, or 270, such as processor 310 of scoring engine server 260.

Process 600 may include receiving and storing known epitypes (block 610). In one implementation, epitype storage server 240 can be used to receive and store known epitypes, which can be sent from epitypes databases. For example, malware epitypes libraries can be commercially available and can include higher malness epitypes and lower malness epitypes such that a range of malness can be used.

Process 600 may include building a learning engine model (block 620). In one implementation, a learning engine model can be build using malness analysis server 230 in conjunction with learning engine model building server 250. For example, learning engine model building server 250 can build a learning engine model by inputting known low, medium, and high malness score applications along with their malness scores, so that the learning engine model can learn application features that lead to low, medium, and high malness scores. In one implementation, the learning engine model can be built using known epitypes provided in block 610.

Figure 8:
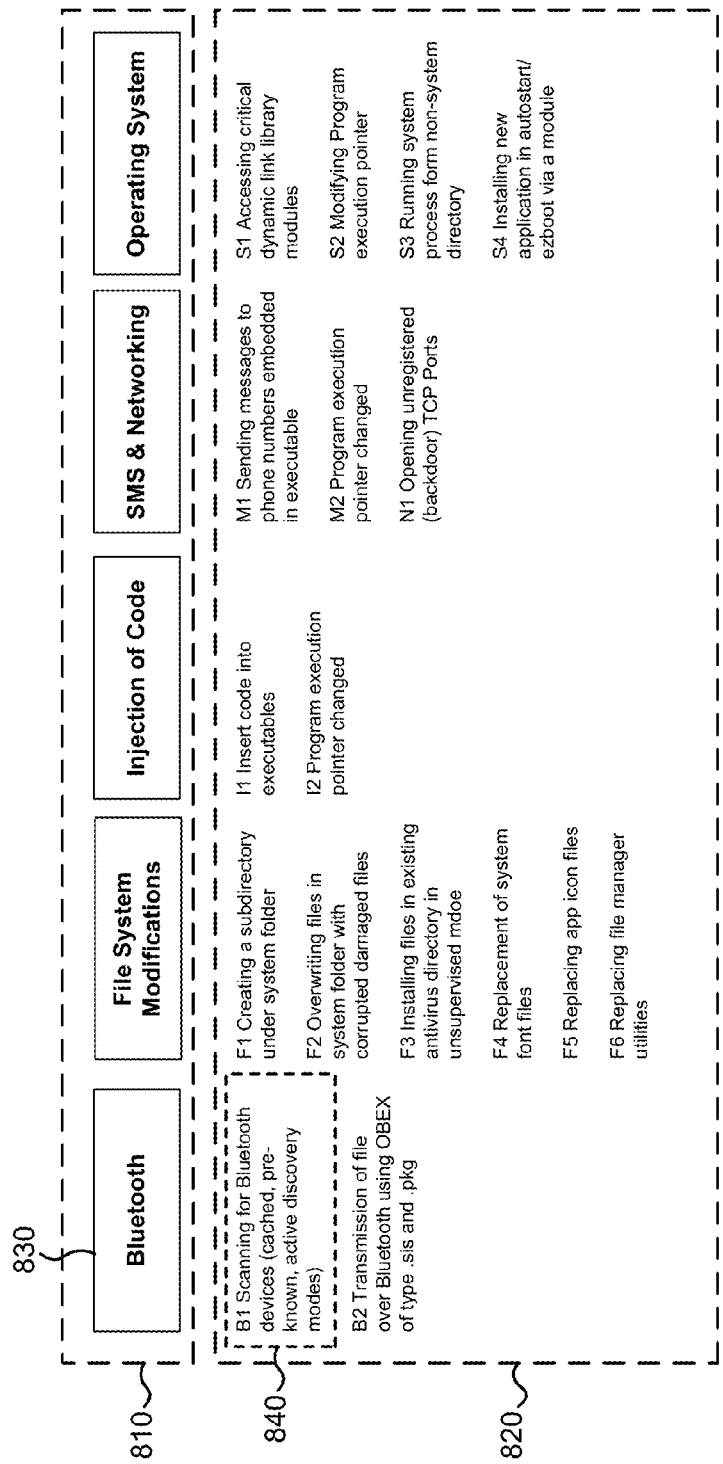
FIG. 8 illustrates an example of a set of known applications with known propagation vector profiles from stored known epitypes.

FIG. 8 illustrates an example of a set of known malware vector profiles 810 with a listing of known misbehaviors 820. As illustrated in FIG. 8, examples of malware vector profiles 810, such as "Bluetooth," "File System Modifications," "Injection of Code," "SMS & Networking," and "Operating System" are provided along with the listing of known misbehaviors 820 associated with the malware vector profiles 810. For example, "Bluetooth" vector profiles 830 can have malness 840 defined by "B1 Scanning for Bluetooth devices," where the "scanning for Bluetooth devices" can utilize resources, such as battery life, unnecessarily. Other examples of profiles and the misbehaviors for the profiles are further illustrated in FIG. 8 in the listing of known malware vector profiles 810 and misbehaviors 820.

Returning to FIG. 6, process 600 may include uploading a learning engine model to scoring engine server 260 (block 630). In one implementation, the learning engine model can be uploaded through network 290 from learning engine model hosting server 250. The learning engine model can be created by learning engine model hosting server 250, as discussed above concerning block 620 and learning engine model hosting server 250.

Process 600 may include receiving new applications for analysis (block 640). In one implementation, new applications can be selected and placed on a list for analysis. For example, new applications can be selected as illustrated in FIG. 4 and placed on a list of applications selected.

Process 600 may include receiving previously analyzed applications (block 650). In one implementation, previously analyzed applications can be included in the list for analysis, where the previously analyzed applications can be re-analyzed if the applications were changed between when the previously analyzed applications were last analyzed and when the previously analyzed applications are selected for re-analysis.

Process 600 may include grouping applications into a list (block 660). In one implementation, the list can include new applications and/or previously analyzed applications received from user device 210 through malness application 410. Grouping applications into lists for analysis allows for more than one application to be analyzed for efficiency (e.g., increasing runtime efficiency per application) and can allow the learning engine model to be adjusted based on the list of applications rather than a series of individual applications (e.g., adjust the learning engine model based on multiple data entries associated with the list of applications compared to single data entries associated with individual applications).

Process 600 may include scoring one or more applications for malness (block 670). In one implementation, applications can be scored for malness by using a learning engine model and scoring engine server 260 to analyze each application for a malness score. For example, scoring engine server 260 can extract data or programming from each application and can score each application based on the extracted data or programming compared to data or programming from the learning engine model to generate a malness score.

Process 600 may include sending malness scores for applications (block 680). In one implementation, scoring engine server 260 can generate a malness score, and can then send the malness score to enterprise device 270, user device 210, or management software. For example, the malness score can be sent to administrators, management software, or users such that informed actions regarding one or more applications on user device 210 can be made. Management software can include user device management software or enterprise management software, for example.

Process 600 may include setting threshold levels for malness scores for application acceptability (block 685). In one implementation, a network administrator can enter values for threshold levels for a first threshold "X" and a second threshold "Y." For example, when the application malness scores are on a scale of 1-100, the first threshold "X" can have a level with a score of 90 and the second threshold "Y" can have a level with a score of 10. As another example, when the application malness scores are on a scale of 1-5, the first threshold "X" can have a level with a score of 4 and the second threshold "Y" can have a level with a score of 1. As another example, when the application malness scores are on a scale of 0-1, the first threshold "X" can have a level with a score of 0.75 and the second threshold "Y" can have a level with a score of 0.25.

Process 600 may include determining whether the malness score for an application (or "application malness score" as used herein) is less than a first threshold level "X" defining the first threshold level (block 690). In one implementation, the application malness score can be compared to "X," where the application malness score can have a malness score higher or lower than the first threshold level "X."

Process 600 may include informing administrator of the application malness score (block 695), if the application malness score is less than the first threshold level "X" (block 690—YES). In one implementation, the application malness score and the first threshold level can be compared and if the application malness score is low enough, it can be deemed "safe" or of a sufficiently low propensity for malness to allow the application on network 290. For example, the application malness score and the first threshold level can be based on a scale of 1-100 and the application malness score can be 5 and first threshold level "X" can be 10, then the application malness score is less than first threshold level "X" and would appear to have a low propensity for malness. In this example, the first threshold level "X" can correlate to a level of propensity for malness below which would be acceptably low for network 290.

In another implementation, an application with a malness score less than the first threshold level can be automatically allowed onto network 290 and a message (block 695), can be sent to inform an administrator of the application malness score.

As illustrated in FIG. 7, process 600 can include determining whether the application malness score is more than a second threshold "Y" (block 710), if an application has a malness score more than the first threshold "X" (block 690—NO) (e.g., the application is not deemed to have an acceptably low propensity for malness). In one implementation, the application can have an unacceptably high malness score when the application has a malness score above the second threshold "Y." For example, an application can be deemed to have a very high malness score, such as 95 on a scale of 100, where the very high malness score could deem the application as having a high propensity for malness if the second threshold "Y" is 90. In this example, the second threshold "Y" can correlate to a level of propensity for malness which would be unacceptably high to allow access by a user device with an application with such a high malness score.

In another implementation, the application can have a malness score that needs further analysis because the malness score is not low enough to be deemed as having an acceptably low propensity for malness (e.g., below the first threshold level "X"), but also not high enough to be deemed as having an unacceptably high level of malness (e.g., above the second threshold level "Y"). For example, the application can have a malness score of 50, the first threshold level "X" can have a value of 10, and the second threshold level "Y" can have a value of 90.

An application with a malness score between the first and second threshold levels (as well as applications with any malness score, including below the first threshold level and above the second threshold level), can be designated as having a medium level of malness, and can be sent for further analysis to the enterprise device 270, an administrator of environment 200, or a server with software for malness management. For example, the enterprise device 270, the administrator of environment 200, or the server with software for malness management can determine whether the malness level of an application is acceptable based on the malness score and other factors. Other factors can include malness vector types, application behavior, application attributes, such as the purpose of the application (e.g., word processing, enterprise support, games) or the publisher of the application (e.g., a trusted publisher, a new publisher), the user of the user device (e.g., a high level technical clearance employee, such as a member of the technical support team, or a low level technical clearance employee, such as a non-technical employee), or level access of the device with the application (e.g., high level access to all of network 290, low level access to only portions of network 290).

Process 600 can include blocking the application and/or user device 210 from accessing network 290 (block 750), if the application malness score is greater than the second threshold level "Y" (block 710—YES). In one implementation, if the application malness score is greater than the second threshold level "Y," then the application can be deemed malware or having a high propensity for malness, and the application and/or the user device 210 can be blocked from accessing network 290. For example, if user device 210 contains an application that is deemed to be malware, then the network administrator or an automated feature can block the application or user device 210 from accessing network 290.

Process 600 may include sending information regarding the application with the "medium" malness score to a server in environment 200 and/or enterprise device 270 (block 720), if the application malness score is less than the second threshold "Y" (block 710—NO) (and also greater than the first threshold, block 690—NO). In one implementation, information regarding an application with a medium level malness score (e.g., above the first threshold level "X" and below the second threshold level "Y") can be sent to an administrator of environment 200 via enterprise device 270, where the information can include characteristic code profiles, vectors for similar epitypes, or other information that may assist the administrator in determining whether to allow the application and/or user device 210 containing the application on to network 290.

Process 600 may include determining whether the administrator decides to block the application or user device 210 (block 730). In one implementation, the administrator can review the information regarding the application decide based on the information that the application should not be allowed on network 290 and block the application or user device 210 from accessing network 290. For example, if the application has a malness score of 50 (e.g., a medium level malness score if "X" is 10 and "Y" is 90), then the administrator can look at the type of application, and characteristics of the application to determine whether the risks of allowing the application and/or the device with the application are acceptable enough to allow the application and/or the device onto network 290. If, for example, the application is from a known provider of malware, then the administrator may block the application and/or the device with the application.

If the network administrator decides to block the application or user device 210 (block 730—YES), then process 600 can include blocking the application or user device 210 (block 750). For example, network access can be denied to user device 210, where user device 210 can be blocked or banned as a hostile device.

If network administrator decides not to block the application or user device 210 (block 730—NO), then process 600 can include sending a warning to user device 210 (block 740). In one implementation, a warning stating that user device 210 has an application containing unacceptable levels of malware, which may also include the name and propensity for malness of the application.

A system and/or method, described herein, may determine malness scores for applications on user device 210 by building a learning engine model from known applications with known malness scores, and using the learning engine model to compare the applications on user device 210 to the learning engine model in order to calculate malness scores of the applications on user device 210. For example, if an application used to build the learning model engine has vectors similar to vectors in an application on user device 210, then the malness score of the application on the user device 210 can be calculated to be the same or similar malness score as the application used to build the learning engine model. This allows for analysis of applications on user device 210 based on known malness scores so that applications that display characteristics similar to known applications with a high propensity for malness to be scored as similarly having a high propensity for malness.

Additionally, a system and/or method described herein, may allow a learning engine model to be revised with new or revised known applications and the applications on user device can be re-scored for malness if the learning engine model is revised.

A system and/or method, described herein, may allow for enterprise and network administrators to control access to network 290 by user devices 210 and applications on user devices 210. In one implementation, the administrators can control access by setting threshold levels to automatically allow applications and user devices 210 on network 290 if a calculated malware score is below a first threshold level, while also automatically blocking applications or user devices 210 if the calculated malware score is above a second threshold level, where the first and second threshold levels can be set by the administrators. Additionally, the administrator can set other controls using information regarding malware to automatically or manually allow applications and/or user devices 210 access to network 290.

Additionally, a system and/or method described herein, may allow the threshold levels to be revised and applications to be re-scored based on the revised threshold levels.

The foregoing description provides illustration and description, but is not intended to be exhaustive or to limit the implementation to the precise form disclosed. Modifications and variations are possible in light of the above teachings or may be acquired from practice of the implementations.

For example, while series of blocks have been described with respect to FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a server, information regarding known epitypes of malness,
      wherein the information includes malness scores and behaviors for the known epitypes of malness,
      wherein the server receives information for setting a first threshold level and a second threshold level, and
      wherein the first threshold level and the second threshold level indicate values that are associated with malness scores that are not malness free values;
   storing, by the server, the information regarding the known epitypes of malness, and the information for setting the first threshold level and the second threshold level;
   building, by the server, a model based on the information regarding the known epitypes of malness stored by the server and information associated with a plurality of malness scores for different applications;
   receiving, by the server, applications from a device for use with the model;
   generating, by the server, other malness scores for one or more of the applications using data from the one or more applications in combination with the model; and
   determining, by the server, a response based on the other malness scores, wherein determining the response comprises:
      allowing one or more of the applications or the device to access a network when the other malness scores for one or more of the applications are below the first threshold level;
      blocking one or more of the applications or the device from accessing the network when the other malness scores for one or more of the applications are above the second threshold level, where the first threshold level is less than the second threshold level; and
      transmitting for further analysis information associated with the other malness scores, for one or more of the applications, when the other malness scores falls within a range that is between the first threshold level and the second threshold level.

2. The method of claim 1, further comprising setting the first threshold level and the second threshold level based on the malness scores for the known epitypes of malness.

3. The method of claim 1, further comprising:
   generating a malness propensity data structure using the other malness scores for each of the one or more applications;
   receiving the malness propensity data structure;
   presenting the malness propensity data structure for display; and
   setting the first threshold level or the second threshold level based on the malness propensity data structure of the one or more applications.

4. The method of claim 1, where building the model includes building the model based on code vector profiles from the known epitypes of malness stored by the server, where the code vector profiles are based on the malness scores and the behaviors corresponding to the known epitypes of malness.

5. The method of claim 1, where the server comprises a cloud-based scoring engine server.

6. The method of claim 1, further comprising:
determining that at least one of the other malness scores, for at least one of the one or more applications, is between the first threshold level and the second threshold level; and
sending the at least one other malness score for the at least one of the one or more applications to an enterprise device or a malware management software program for determination of whether the at least one of the one or more applications or the device is permitted to access the network.

7. The method of claim 1, further comprising:
revising the first threshold level or the second threshold level by an enterprise device or a malware management software program; and
allowing or blocking one or more applications based on the revised first threshold level and the revised second threshold level.

8. A system, comprising:
one or more servers to:
receive information regarding known epitypes of malness,
wherein the information includes malness scores and behaviors for the known epitypes of malness,
wherein the information includes values for setting a first threshold level and a second threshold level,
and wherein the first threshold level and the second threshold level indicate values that are associated with malness scores that are not malness free values;
store the information regarding the known epitypes of malness, and the information for setting the first threshold level and the second threshold level;
generate rules for a model based on the information regarding the known epitypes of malness and information associated with a plurality of malness scores for different applications;
input application data from an application on a device into the model;
output a malness score for the application from the model based on the application data;
allow the application or the device access to a network when the malness score for the application is below the first threshold level,
block the application or the device access to the network when the malness score the application is above the second threshold level, where the first threshold level is less than the second threshold level, and
transmit for further analysis information when the malness scores, for the application falls within a range that is between the first threshold level and the second threshold level.

9. The system of claim 8, where the one or more servers are further to:
set the first threshold level and the second threshold level based on the malness scores for the known epitypes of malness; or
receive the first threshold level and the second threshold level based on the malness scores for the known epitypes of malness.

10. The system of claim 9, where the one or more servers are further to:
generate a malness propensity data structure using the malness score for the application;
receive the malness propensity data structure;
present the malness propensity data structure for display; and
set the first threshold level and the second threshold level based on the malness propensity data structure of the one or more applications.

11. The system of claim 8, where the one or more servers build the model based on code vector profiles from the known epitypes of malness stored by the one or more servers, where the code vector profiles are based on the malness scores and the behaviors corresponding to the known epitypes of malness.

12. The system of claim 8, where at least one of the one or more of the servers comprises a cloud-based scoring engine server.

13. The system of claim 8, where the one or more servers are further to:
determine that the malness score, for the application, is between the first threshold level and the second threshold level; and
send the malness score for the application to an enterprise device or a malware management software program for determination of whether the application is permitted to access the network.

14. The system of claim 8, where the one or more servers are further to:
revise the first threshold level and the second threshold level by an enterprise device or a malware management software program.

15. A system, comprising:
an epitype storage server that receives information regarding known epitypes of malness, where the epitype storage server stores the information regarding known epitypes of malness and information for setting a first threshold level and a second threshold level, where the information includes malness scores and behaviors for the known epitypes of malness, and where the first threshold level and second threshold level indicate malness scores that are not malness free values;
a malness analysis server that builds a model based on the information regarding the known epitypes of malness stored by the epitype storage server and information associated with a plurality of malness scores for different applications; and
a scoring engine server that uploads the model, and where the scoring engine server is further to:
receive, from a device, applications data that corresponds to a plurality of applications, where the plurality of applications are included on a list for malness scoring,
generate a malness score for each of the plurality of applications using the model and the applications data,
allow access to a network for one or more of the plurality of applications or the device that includes the one or more of the plurality of applications when the malness scores for the one or more of the plurality of applications are below a first threshold level,
block access to the network for the one or more of the plurality of applications or the device that includes the one or more of the plurality of applications when the malness score for the one or more of the plurality of applications is above a second threshold level, and where the first threshold level is less than the second threshold level, and
transmit for further analysis information associated with the malness scores for one or more of the applications, when the malness scores falls within a range that is between the first threshold level and the second threshold level.

16. The system of claim 15, where the scoring engine server is further to:
set the first threshold level and the second threshold level based on the malness scores for the known epitypes of malness.

17. The system of claim 15, where the scoring engine server is further to:
generate a malness propensity data structure using the malness scores for each of the one or more applications;
receive the malness propensity data structure;
present the malness propensity data structure for display; and
set the first threshold level or the second threshold level based on the malness propensity data structure of the one or more applications.

18. The system of claim 15,
where building the model includes building the model based on code vector profiles from the known epitypes of malness stored by the epitype storage server, and where the code vector profiles are based on the malness scores and the behaviors corresponding to the known epitypes of malness.

19. The system of claim 15, where the scoring engine server is further to:
determine that the malness score for at least one of the plurality of applications is between the first threshold level and the second threshold level;
send the malness score for the at least one of the plurality of applications to an enterprise device or a malware management software program for determining whether the at least one of the plurality of applications is permitted to access the network; and
block or allow access to the network by the at least one of the plurality of applications or the device based on instructions from the enterprise device or the malware management software program.

20. The system of claim 19, where:
the epitype storage server receives additional information regarding additional or revised known epitypes of malness, where the epitype storage server stores the additional information regarding the additional or revised known epitypes of malness;
the malness analysis server revises the model based on the additional information; and
the scoring engine server generates a revised malness score for the one or more of the plurality of applications using data from the one or more of the plurality of applications in combination with the model.

* * * * *